Feb. 28, 1967  M. VALLINOTTO ETAL  3,307,140
CLAMPS FOR THE FASTENING OF WIRES TO THE
TERMINALS OF ELECTRIC BATTERIES
Filed March 11, 1965
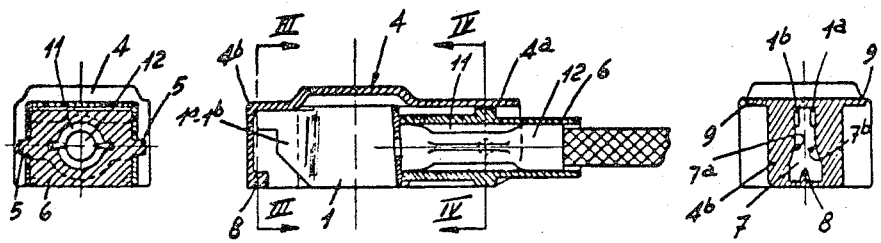
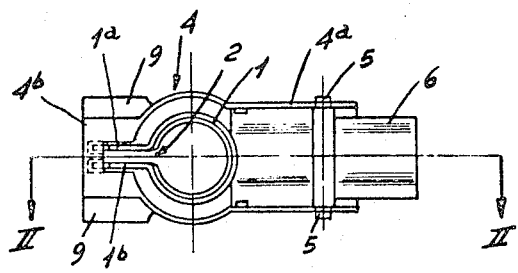
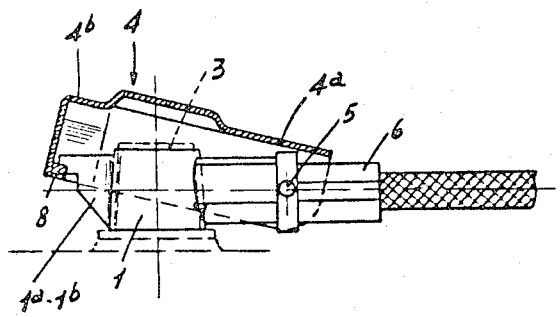
INVENTORS.
MICHELE VALLINOTTO and LUIGI VILLATA
BY 3,307,140
CLAMPS FOR THE FASTENING OF WIRES
TO THE TERMINALS OF ELECTRIC
BATTERIES
Michele Vallinotto and Luigi Villata, Moncalieri, Italy, assignors to Costruzioni Meccaniche Val-Ni S.p.A., Moncalieri, Italy
Filed Mar. 11, 1965, Ser. No. 439,014
Claims priority, application Italy, Mar. 20, 1964, 6,440/64
3 Claims. (Cl. 339—226)

This invention relates to a protected clamp for the fastening of wires to the terminals of electric batteries and in particular of the batteries equipping the electric circuit in vehicles. The first important object of the invention is that of supplying a clamp in which the leading metal part is constantly protected, both when it is under tension in order to obtain a protection from the short-circuit and the deposit of strange bodies, and when the clamp is not fastened so that it is protected against shocks or hand-uses that could damage the contact surfaces of the leading part with the result of a bad function in the contact itself. Another object of the invention is that of supplying a clamp, as described, built in such way of resulting springless, without bolts and other similar fasteners consenting so an unlimited number of setting up and setting off motions without changing the initial properties.

A further object of the invention is that of providing a clamp as above said, easier altogether, therefore fitted to be perfectly blocked on the terminals of the battery doing a simple manual function of pressure and likewise so that it can easily be unfastened by a manual action of traction: tools such as wrenches, keys etc. being avoided. The above said and further object will result much more evidently by the following detailed description and with reference to the here enclosed drawings supplied as an example not restrictive in which:

FIG. 1 is a view from the bottom of the clamp.

FIG. 2 is a longitudinal and axial section according to the line II—II of FIG. 1 showing in particular the clamp with its lid in closed position.

FIG. 3 is a transversal section according to the line III—III of FIG. 2.

FIG. 4 is a transversal section according to the line IV—IV of FIG. 2.

FIG. 5 is a view in a lateral elevational, partially sectioned, illustrating the clamp with its lid in an open position.

A clamp according to the invention includes essentially a leading thimble body formed by a ring cut where there is a generator and ending with right placed winglets; a lid for the protection of the side body made of insulating material and articulated to be movable in comparison with the body itself, a loop-hole with a cam outline on the interior part of the side of the said lid fitted to engage the above winglets in order to approach them and force the said ring into tight contact with the terminal of the battery when the said lid is in a closed position lower on the said body and a wedge at the end of the opening fit to penetrate among the said winglets with the purpose of diverging them and disengaging the said ring from the contact of the said terminal when the said lid is overturned in the open position.

In the drawings with 1 a thimble body is indicated, formed by a metal ring advantageously in brass or copper of thickness proportioned to the electric load and with a galvanic treatment against corrosion.

The ring 1 is interiorly cut into two parts extending to a couple of winglets 1a and 1b rightly placed so that to assume in transversal section, an outline substantially C shaped. Besides ring 1 is axially tapered in truncated cone to adhere tightly to the terminal 3 of the battery (The terminal 3 being itself conformed in truncated cone too.)

On the ring body 1 is set a lid 4 of material electrically insulating such as presenting a central cylindrical area apt to contain the ring 1. The said central area stretches into areas 4a and 4b respectively called posterior and interior, the former of which presents holes in which are engaged the ends 5 of an articulating pivot brought by an appendix or a hub 6 of the thimble-body in comparison with which the said lid results oscillating.

The interior part 4b of the lid, is provided with a frontal loop-hole 7 apt to engage the ends of the winglets 1a and 1b of the thimble ring. The lateral walls 7a and 7b of the said loop-hole are cam shaped and go converging towards the upper part of the lid to engage the said winglets to approach them and forcing so the ring 1 and obtaining a tight contact with the terminal 3 when the said lid is in a closed position as shown in FIG. 2.

At the inferior side of the loop-hole 7 there is also an appendix 8, wedge shaped which is apt to penetrate among the winglets 1a and 1b in order to open them and disengage the ring 1 from the contact with the terminal 3 when the lid is in its open position as illustrated in FIG. 5. The presence of the said wedge is advantageous to produce the opening of the ring even when this is casually in contact with the terminal owing to the presence of some oxidations or similars; resulting unsufficient the only elastic action of the ring in such case.

In the illustrated example the loop-hole 7 is closed at the bottom and on the bottom edges of it lie the winglets 1a and 1b when the lid is in overturned position limiting such position and consenting the extraction of the ring with a simple traction action on the lid.

For this purpose the lid itself is supplied with a couple of anterior winglets 9 which facilitate the hold. According to a variation not illustrated, the loop-hole 7 can be opened at the bottom to consent the total overturning of the lid with reference to the thimble body.

Such performance may be necessary for special employments where to have in sight the thimble body and the terminal of the battery is needed.

Obviously in this case the wedge 8 will be oval shaped and will be bound to the upper edge of the loop-hole. The hub 6 above mentioned is preferably pressed in plastic antishocks with high mechanical properties. The said hub is provided with an axial hole 11 to insert the wire and it is wedged up a metal pipe of the thimble body 12. The hole 11 and the pipe 12 being supplied with a channelling and sinews respectively co-operating relative to the fitting in, in order to fix the relative position of said elements.

The hub length 6 is preferably enough to cover also the insulating case of the wire for an extension of 5 mm. about with the purpose of absorbing the wire vibrations and avoiding to break the internal braid.

The internal surface of the thimble ring apt to adhere to the terminal, may be worked, for instance, by knurling or other working of equal pretence. Such working may be effected on the clamp according to the invention because the said thimble ring results sufficiently opened both in the setting up and in the breaking off. This variation is of particular interest for employments of the clamp on vehicles highly overstressed or where there are frequent rotations of batteries and consequently mechanical wear of the clamps.

The embodiment of the invention described herein is to be understood to be by way of illustration only, the scope of this invention being defined by the appended claims.

We claim:
1. A clamp for fastening the wires at the terminals of electrical batteries comprising a metal clamp comprising a circular ring portion for receipt of a battery terminal post and two winglets projecting therefrom, hub means attached to the clamp on the side opposite the winglets for receipt of electrical cable, and lid means for covering the metal clamp and hub portion adjacent thereto, the lid means having a first end pivotly attached to the hub means and a second end extending downward over the end of the two winglets, and downwardly diverging wedge-shaped frontal loophole cam means in the second end of the lid means receiving the two winglets, whereby the winglets are pressed together when the lid means is pivoted downwardly to a first position and are released when the lid means is pivoted upwardly to a second position.

2. The clamp of claim 1, wherein the loophole cam means is closed on the bottom thereof, whereby the lid means remains in position covering the metal clamp and hub in both the first and second pivotal positions thereof.

3. The clamp of claim 2, wherein the bottom of the loophole cam means includes an upwardly projecting wedge means aligned between the two winglets for forcing the winglets apart when the lid means is pivoted upwardly to the second position.

References Cited by the Examiner
UNITED STATES PATENTS

| | | | |
|---|---|---|---|
| 2,119,294 | 5/1938 | Schaefer | 339—116 |
| 2,769,964 | 11/1956 | Lartz | 339—226 |
| 2,819,455 | 1/1958 | McGray | 339—238 X |

BOBBY R. GAY, *Primary Examiner.*

W. DONALD MILLER, *Examiner.*

UNITED STATES PATENT OFFICE
CERTIFICATE OF CORRECTION

Patent No. 3,307,140 February 28, 1967

Michele Vallinotto et al.

It is hereby certified that error appears in the above numbered patent requiring correction and that the said Letters Patent should read as corrected below.

In the heading to the printed specification, lines 6 and 7 for "Costruzioni Meccaniche Val-Ni S.p.A., Moncalieri, Italy" read -- Costruzioni Meccaniche Val-Vi S.p.A., Moncalieri, Italy --.

Signed and sealed this 9th day of January 1968.

(SEAL)
Attest:

Edward M. Fletcher, Jr.  EDWARD J. BRENNER
Attesting Cfficer  Commissioner of Patents